F. P. SMITH.
APPARATUS FOR PURIFYING LIQUIDS.
APPLICATION FILED FEB. 8, 1906.
924,285.
Patented June 8, 1909.
4 SHEETS—SHEET 2.
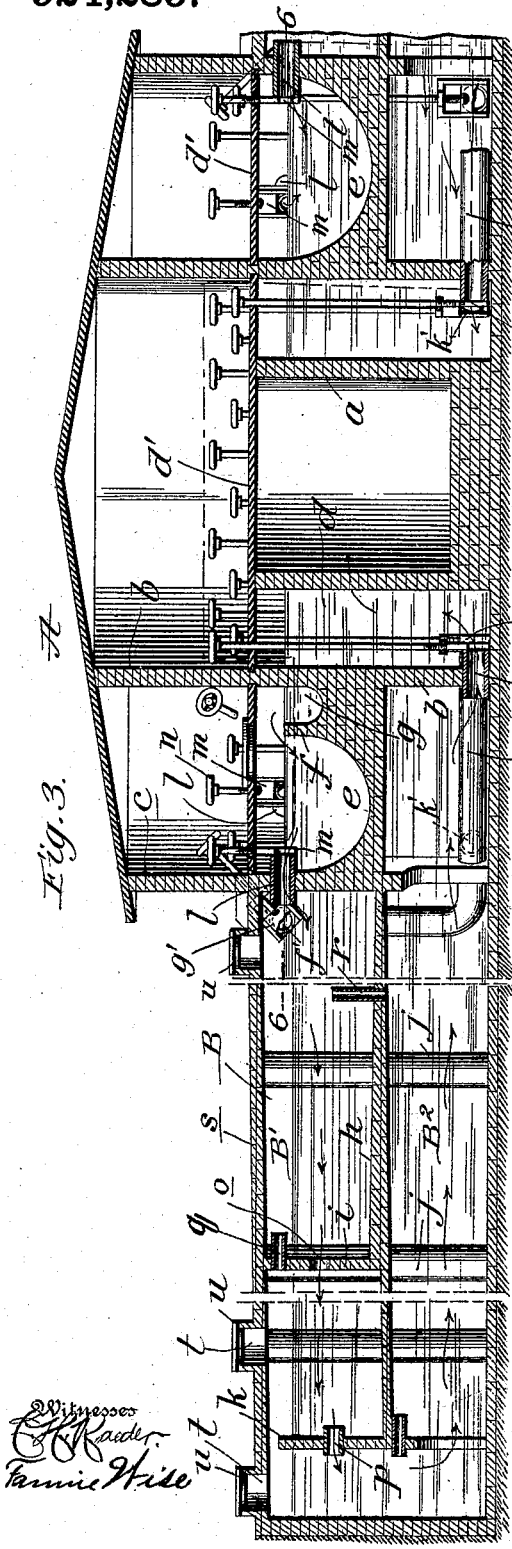
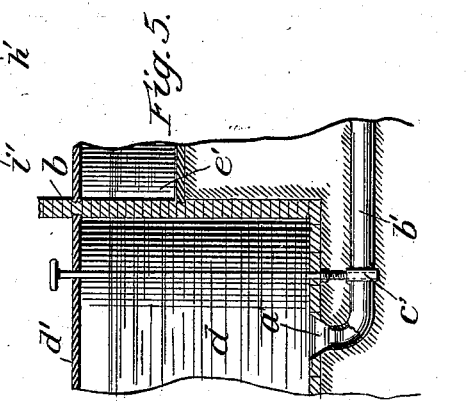
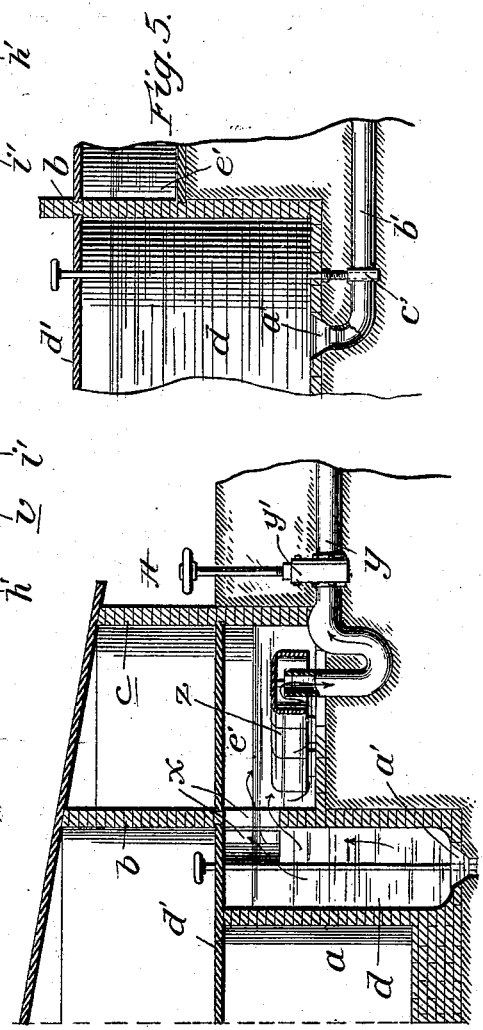

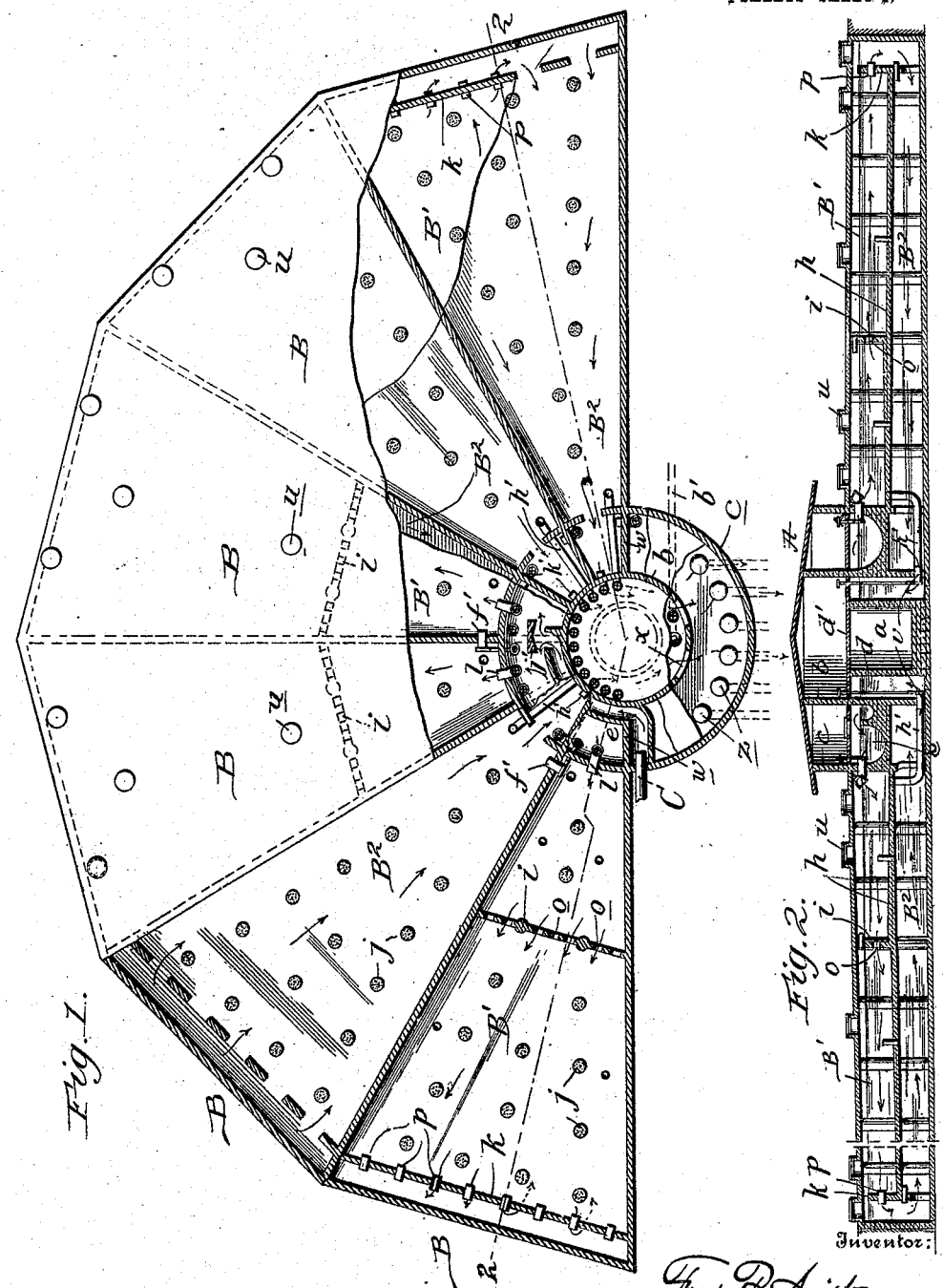

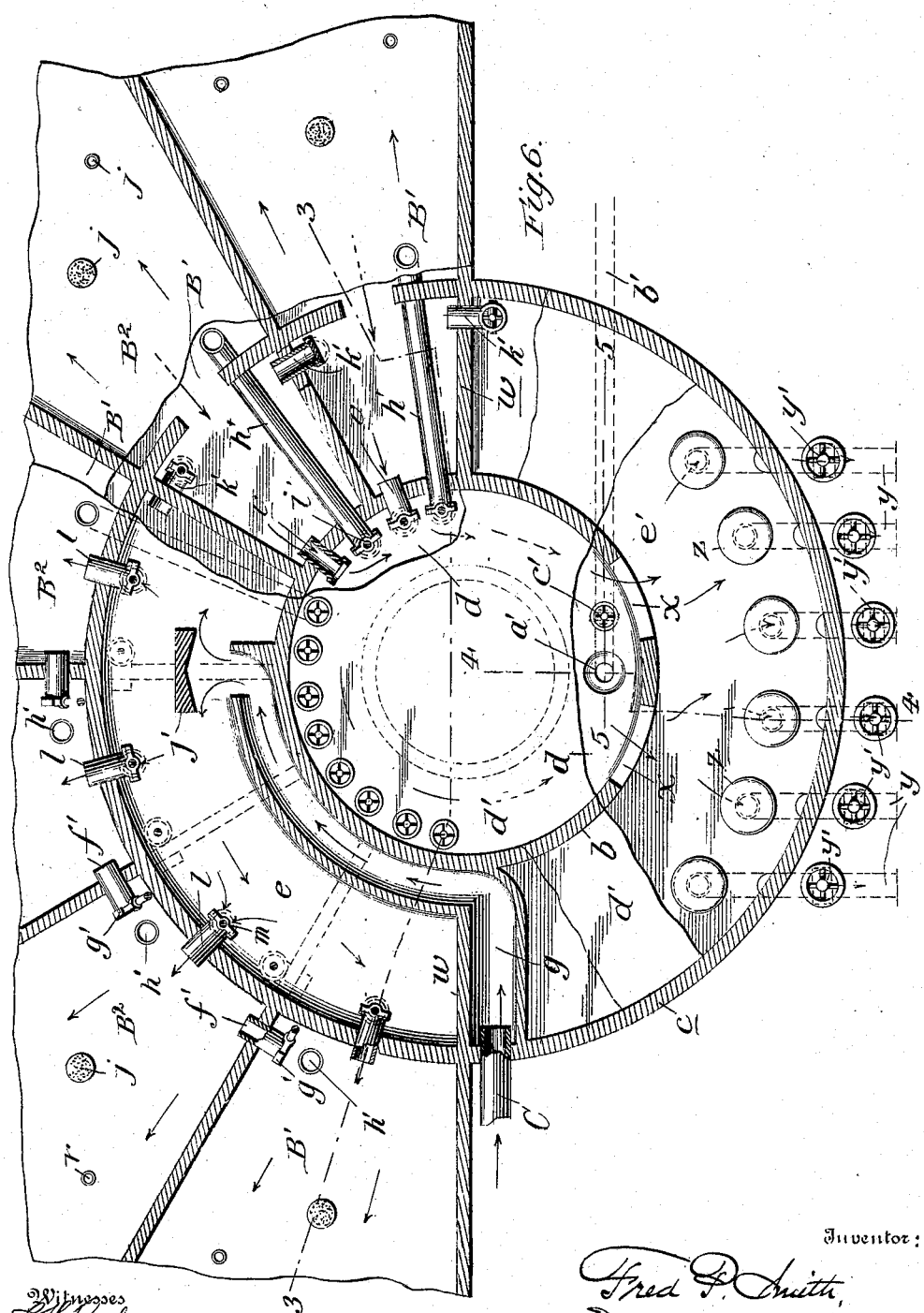

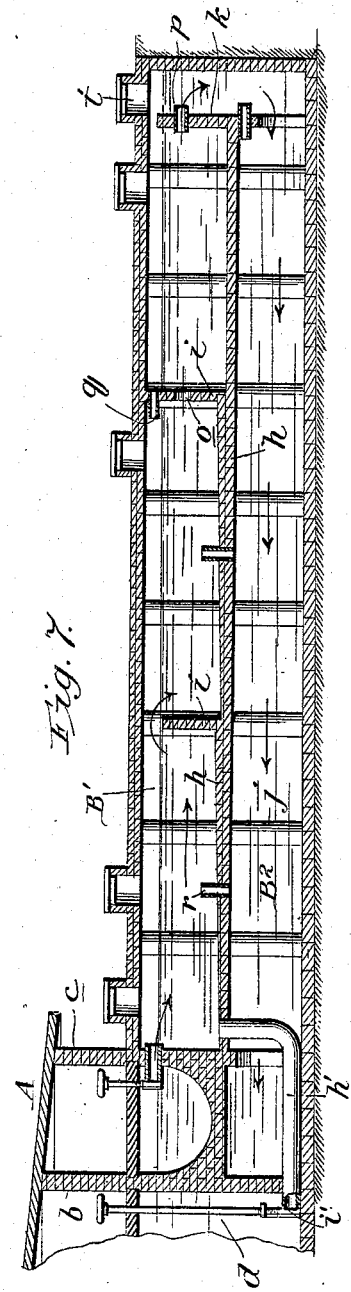

UNITED STATES PATENT OFFICE.

FRED P. SMITH, OF KANSAS CITY, MISSOURI, ASSIGNOR OF ONE-HALF TO EDWARD C. LEWIS, OF CHICAGO, ILLINOIS, AND JOHN H. KITCHEN, OF KANSAS CITY, MISSOURI, COPARTNERS.

APPARATUS FOR PURIFYING LIQUIDS.

No. 924,285.  Specification of Letters Patent.  Patented June 8, 1909.

Application filed February 8, 1906. Serial No. 300,133.

*To all whom it may concern:*

Be it known that I, FRED P. SMITH, a citizen of the United States, residing at Kansas City, in the county of Jackson and State of Missouri, have invented certain new and useful Improvements in Apparatus for Purifying Liquids, of which the following is a specification.

This invention pertains to apparatus for purifying liquids; and is designed more particularly for the deposition and removal of solid matters from sewage; for the purification of water; and for like uses.

The invention consists in various novel features which will be set forth in detail herein, prominent among which, however, may be mentioned a sector-shaped settling tank or chamber having two separate compartments, one above the other, and having both the inlet and the discharge opening located at or near the apex, so that a relatively long travel of the liquid may be obtained within a comparatively limited area or ground space, and the liquid may be caused gradually to spread over a greater area, and consequently to move more slowly as the process of depositing the suspended matters progresses, and whereby the area is reduced and the flow hastened as the final outlet is approached. Provision is also made for drawing off the liquid from either chamber or compartment of a tank at will, and in the case of a plurality of tanks, provision is made for causing a flow to take place from one to another, when deemed advisable.

My invention is illustrated by the accompanying drawings in which,

Figure 1 is a plan view of a plant or apparatus constructed in accordance with my invention, portions being broken away to different levels to show the construction and arrangement of the chambers, passages, etc.; Fig. 2, a vertical section on the line 2—2 of Fig. 1; Fig. 3, a section similar to Fig. 2, except that it is on a larger scale and that portions are broken away or omitted to permit such larger scale; Fig. 4, a vertical section on the line 4—4 of Fig. 6; Fig. 5, a vertical section on the line 5—5 of Fig. 6; Fig. 6, a horizontal section on the line 6—6 of Fig. 3; Fig. 7, a vertical section of a tank having a plurality of cross-partitions and showing one of said partitions stopping below the roof of the chamber, the vents $q$ being in such case omitted.

In a structure or apparatus of this character, it is desirable to centralize or group within as small a space as practicable all controlling apparatus, such as inlets and outlets, controlling valves, and the like, and, as far as is consistent with proper travel and treatment of the liquid, to keep the apparatus within as small an area as possible. It is also desirable to adopt a unit system of construction, whereby the capacity of the apparatus may be increased proportionately with the increasing requirements, without replanning or designing, and by merely duplicating or multiplying what is contained in the first construction. With these objects in view, I adopt a construction illustrated in the drawings, comprising a central structure, preferably of circular or substantially circular form, containing the various inlet and outlet pipes, valves, etc., and radiating therefrom a series of sector-shaped chambers, each of which is, or may be, identical with its companions in all particulars.

Referring to these drawings, A indicates the central building or structure, and B, B, &c. a series of sector-shaped chambers, grouped about or radiating from said central structure. The central structure A may conveniently consist of three concentric walls $a$, $b$, and $c$, suitably roofed over or inclosed and constituting, between the walls $a$ and $b$, and $b$ and $c$, annular receptacles $d$ and $e$, which latter may be again divided by a wall $f$, to produce the additional trough or conduit $g$. The trough or conduit $g$ is designed to receive the liquid to be treated, which is delivered to said trough by a pipe sewer or other conductor C. The inner end of the trough $g$ opens into the larger trough $e$. The receptacle $e$ is preferably made in the form of a trough of semi-circular cross section, and the receptacle $d$ is represented as merely an annular well, the bottom of which is at the same level with the bottom of the sector-shaped chambers or tanks B. The trough $e$ has its bottom at approximately the same level as the upper compartment of the chamber B, while a space is left beneath the trough $e$ of a height equal to that of the lower compartment of the chamber B, or thereabout.

Each chamber B is of sector-shape, its two side walls being radial to the center of the structure A, as shown in Figs. 1 and 6. Each chamber B is provided with a horizontal partition $h$, forming a floor for the upper compartment and a roof for the lower compartment. This partition for a portion of its length slopes toward the central structure A, and for the remainder of its length may be horizontal, or, and as is preferred, may incline outwardly or away from the central structure.

The upper compartment $B'$ of each chamber B is divided by a transverse wall or partition $i$ into two sections, the partition serving the double purpose of partition and roof support, and being for that purpose provided with piers or columns $j$, which extend to the floor of the lower chamber or compartment $B^2$, so as to aid in carrying the horizontal partition $h$. Similar columns are provided at frequent intervals throughout the area of each chamber. At a point somewhat within the outer wall of each chamber B there is a vertical wall or partition $k$, which preferably rises nearly, but not quite to the roof of the chamber. In its lower portion, or that portion below the horizontal partition $h$, this wall $k$ is provided with an arch, or series of arches, through which the liquid treated may pass into the space beneath said horizontal partition, the space between the wall $k$ and the outer wall of the chamber forming a well or passage, as shown.

The liquid to be treated flows from the trough $g$ into the trough $e$, and thence through pipes $l$ into the upper compartments of the chambers B, each pipe being guarded by a gate or valve $m$, preferably moved by a screw $n$ provided with a hand wheel, as indicated in Figs. 3 and 6.

I have shown in the drawings, a single pipe $l$ for each chamber B, and ordinarily shall use but one, making this of adequate capacity to supply such chamber, though I may, if found desirable, use a plurality of such valved pipes. The partition $i$ of each chamber B is provided with a series of openings $o$, the aggregate area or capacity of which is equal to that of pipe $l$. These openings are spaced at approximately uniform distances apart in the partition $i$ and all at one common level, so that the liquid entering the first section of the compartment $B'$ and spreading out therein, as the space widens, will flow equally through each of said openings into the second section of the chamber $B'$, thus distributing the liquid evenly over the narrower end of the second section of the chamber. To insure like uniform spreading out and even flow of the liquid in all portions of the second section of the chamber $B'$, the wall $k$ is similarly provided with a series of outlet openings $p$, arranged at a common level and spaced with substantial uniformity of distance apart therein. In practice, I deem it advisable to give to the inlet pipe $l$ a size or capacity approximately equal to the aggregate capacity of the openings $o$ of partition $i$ and to the aggregate capacity of the openings or outlets $p$ of the wall or partition $k$. This, however, is not essential. For the purpose of equalizing the pressure in the two sections of each chamber B incident to the compression of air through the inflow of the liquid or through generation or liberation of gases, I provide the partition $i$ with a vent pipe or pipes $q$ at a point above the level ordinarily obtained by the liquid, and a like provision is made in the wall or partition $k$ below the horizontal wall or partition $h$, the tendency of the gases or confined air being, of course, to accumulate immediately beneath said floor or partition. Further relief is afforded for such accumulating air or gases by means of vertical pipes or vents $r$, opening through the floor or partition $h$ and rising to a suitable height in the upper compartment $B'$ of the chamber B. These pipes may extend above the liquid level in the chamber $B'$, though I prefer to make them of less height since their capacity is limited, and the quantity of liquid which might flow through them prior to the complete filling of the lower chamber $B^2$ is negligible. The roof $s$ of the chambers B is provided at suitable points with man-holes $t$ having removable covers $u$ which serve normally to prevent the escape of gases and odors, but which afford means of entrance for the purpose of cleaning or repairing the apparatus.

The outer wall of the structure A at those points opposite the inner ends of the chambers B is provided with arches through which the liquid flows into the space beneath the trough $e$, and the wall $b$ of said central structure is provided with pipes $c$ on a level with the bottoms of the chambers $B^2$, or practically so, through which the liquid may pass into the annular well or chamber $d$ of the central structure, as well shown in Figs. 3 and 6.

The trough or tank $e$ is divided by partitions or cross-walls $w$ into two compartments, the main section $e$ receiving the inflowing liquid, as above explained, and the second section $e'$ communicating by openings or passages $x$, formed through the wall $b$ with the well $d$, as best shown in Figs. 4 and 6. Within the section $e'$ of the trough or tank $e$ I group a series of discharge pipes $y$, each provided with a bell or cap $z$ with the upturned end of the pipe constituting a trap or seal, the pipes being further bent to form a second seal at a point below the bottom of the chamber $e'$, as shown in Fig. 4. This construction forms a siphon, and the siphons are adapted and arranged to operate successively to discharge the liquid at any desired point, such, for instance, as a filter-bed. The liquid entering the well or chamber $d$ and passing through the openings $x$ into the trough or tank $e'$ will rise to a level at least equal to the top of the upturned end of the pipes $y$, hence said pipes will, at all times, be sealed in said chamber as well as below. When the liquid rises above the level of the top of the upturned ends of pipes $y$ it will empty into said pipes, and by siphonic action reduce the level of the liquid in chamber $e'$ to that of the lower ends or mouths of the bells or caps $z$, but again the liquid will gradually rise until it reaches the level of the upturned ends of pipes $y$. In order that the siphons may be brought into action successively, or that the discharge may be made through any one or more of the pipes $y$ at pleasure, said pipes may be provided with valves $y'$, as indicated in Figs. 4 and 6.

At a suitable point in the well $d$ I provide an outlet opening $a'$, connecting with a waste pipe or sewer $b'$, said outlet being controlled by a valve $c'$, the operating stem of which rises through the well $d$ and carries, at a point above the floor $d'$ of the structure A, a suitable hand wheel, by which to operate the valve. By opening the valve $c'$ the contents of the well $d$ may at any time be discharged into the sewer or other outlet, whereas, when the valve is closed, the contents of said chamber will be discharged when rising to the opening $x$, so that they may flow into the chamber or section $e'$ of the tank or trough and escape thence by the pipes $y$.

It is desirable at times to establish communication between the different chambers B, for which purpose I provide connecting pipes $f'$, each having a gate or valve $g'$ by which it may be opened and closed. These are arranged in the walls separating the chambers and are essentially the same as the pipes $l$, with their valves $m$, in the outer wall $c$ of the central structure A. So too, it is at times desirable to discharge the contents of the inner section of the upper chamber B' directly into the well $d$, and to this end, I provide each chamber B' with an outlet pipe $h'$ passing to the well $d$, as shown in Figs. 3 and 6, said pipes being each furnished with a valve $i'$, the stem of which rises above the floor of structure A and is provided with a hand wheel in the same manner as the other valves already referred to.

To effect a proper diffusion or spreading of the inflowing current, I preferably place opposite the mouth of the trough or inlet channel $g$, a deflector $j'$ (Fig. 6) which divides the stream and directs one portion to the right and another to the left.

The apparatus being thus constructed, its operation is as follows: The liquid, such as water carrying sediment or impurities, or sewage, or other liquid body requiring purification, is introduced into the trough $e$ through the pipe C and trough or conduit $g$ and flows thence by pipe, or pipes, $l$ into chamber or chambers B. As the action is the same in each chamber, it will be sufficient to describe the flow and operation in one such chamber. As the liquid enters at the smaller or narrower end of the chamber B it spreads out over the floor in a constantly widening stream or body, and as the width increases, the rate of flow, of course, decreases, producing the condition most conducive to the settling or precipitation of the solid matters held in suspension by the liquid. These matters are largely deposited in the first section of the chamber B', through which the liquid flows into the second and broader section of said chamber. From said second section, relieved of the larger and heavier matters previously carried by it, the liquid further spreads out by reason of the separated openings $o$ and flows still more slowly through the second and larger section of chamber B', thus permitting further and more complete depositing of sediment or matters held in suspension, the liquid finally flowing out through the pipes or openings $p$ gradually and quietly. Passing from the upper chamber B' into the lower chamber B² free from matters previously held in suspension, or substantially so, the purified liquid flows toward the outlet $v$ and enters the well $d$, whence it passes either to the section $e'$ of the trough $e$ and thence to the outlet pipes $y$, or directly to the outlet $a'$, in case the valve $c'$ be open. If desired, the liquid may be treated in any desired way in the tank or trough $e$, or in the chambers B', B², or in the well $d$ or tank $e'$. The treatment may be by or with the aid of chemicals introduced to act upon the impurities carried by the liquid, either to facilitate their precipitation or coagulation, or to effect chemical reaction and change, or a septic may be introduced, or inherently propagated bacteria, according to the nature of the result sought. The particular mode or process of treatment is not a part of the present invention, which invention concerns only the structure itself. This structure is well adapted to the various modes or processes of treating sewage and other liquids requiring purification, now well-known, whether such treatment be merely by sedimentation or deposition, by septic, or by bacterial action. The chemicals, if chemicals be used, may be introduced into either of the annular receptacles $d$, $e$, the trough or conduit $g$, or any of the sector-shaped chambers. No further or special means for effecting such chemical treatment is herein contemplated, my purpose in referring to such chemical treatment being merely to indicate that the apparatus herein described is adapted without change, alteration, or addition, for the carrying out of well-known systems or methods of chemical treatment. It will be observed that the same central structure will answer for a plant of widely varying capacity, the sector shaped chambers being multiplied or added to from time to time, as occasion requires, until the structure assumes a substantially semi-circular form, or even a larger section of a circle.

In the drawings I have represented the chambers B as having straight outer walls, making up a polygonal instead of a regularly curved outer wall, and this will be found convenient ordinarily, though it is not essential. The proportion of the chamber or trough e which shall be given up to the outlet pipes or to the section e' may vary. It is here represented as constituting approximately one-half the circle, but materially less than this will suffice, the outlet pipes y being capable of closer arrangement and permitting a larger number of sector-shaped chambers B to be employed.

I am aware that it is not broadly new to provide a sector-shaped chamber for the treatment of sewage, in order to cause the sewage to enter at the narrower and to flow toward the wider end of such chamber, but so far as I am aware, it has never before been proposed to make such chamber with an upper and lower section, or with a horizontal partition, so that there may be effected in the one chamber the gradual diffusion or spreading out of the liquid to facilitate deposition of suspended matter and concentration; and in the other chamber to direct and hasten the outflow at one point. By this superposition of the chambers, I obtain within limited area, a relatively long travel of the liquid under the conditions best calculated to insure deposit or precipitation of the solid matters, and I thereafter bring the purified, or relatively clear liquid, directly and promptly to the discharge port.

The floor d' of structure A is provided at convenient points with manholes having removable covers to afford access to the spaces or chambers beneath. This floor should be tight to prevent the escape of vapors and odors into the upper part of the structure which will be occupied by the attendants. This upper space of the structure A may be lighted and ventilated in any convenient manner and the central well, best shown in Fig. 3, may be utilized for any convenient purpose, as for instance, to receive machinery of any kind required in connection with the apparatus, or for heating and ventilating appliances, if such be necessary.

While I have shown and described the apparatus arranged to receive the liquid in the tanks B above the partition h, and to discharge below the same in each section or compartment, this arrangement may be reversed by using two or more tanks B in series, the liquid in such case entering the second tank or compartment at the bottom, or below the partition, and rising thence to the upper chamber above said partition. This is effected with the apparatus above described in the following manner: Liquid requiring treatment passes to the trough e and thence by pipe l into one of the tank sections B, traversing first the upper chamber B', and then flowing back beneath the partition h through chamber B², as under the normal operation before described. The outlet passage v of this chamber being closed, and the lateral passage k' being open, the liquid passes thereby to the lower chamber B² of the adjoining section, flowing thence to the outer end of said chamber, and rising into the upper chamber B'. From the upper chamber of this second section it may pass by the pipe h' to the well or chamber d, or it may be carried through the lateral connecting pipe f' to a third tank section or chamber B. In this way two or more settling tanks or chambers may be used in series, and this may be carried to any extent desired. Since, however, the upper chamber is more readily accessible for cleaning than is the lower chamber, and the material deposited therein may be more readily thrown out through the man holes in the roofs, it is preferred to effect such precipitation in the upper chamber, and consequently to have the liquid enter such upper chamber first, in each compartment or chamber B of the apparatus.

With the construction just described the upper chamber may be cleaned out without removing the bacterial liquid contained in the lower chamber, it being necessary only to have the liquid level drop down to the approximate level of the floor or partition h.

When the chambers B' are cleaned and the solid matters removed, said chambers may be flushed to thoroughly cleanse them, the waste water escaping by the pipes h' to the well d, and thence by outlet a' to the sewer or discharge.

While I have shown and have referred to but one cross partition i within the chamber B', it is obvious that more than one may be employed, if desired. While I have shown and prefer to construct the partition i of the full height of the chamber, so as to give additional support to the roof, it is obvious that it may stop short of said roof, in the same manner as does wall or partition k. In such event, the vents q may be omitted and the liquid may flow over the top of the partition, which being made truly horizontal, will effect an even distribution of the water from side to side of the chamber. I prefer, however, the construction shown, not only because of the better support afforded to the roof, but also because I deem it advantageous to take off the liquid, or permit its escape, from the first to the second section of the chamber B' at a point below its upper level, so as to hold back any scum that may lie upon its surface.

Having thus described my invention, what I claim is:

1. In an apparatus for the treatment of liquids, a tank, progressively widening horizontally from one end toward the other and provided with a horizontal partition separating it into two chambers, one above the other, said tank being provided with an inlet and with an outlet at its narrower end, one above and the other below the horizontal partition.

2. In an apparatus for the treatment of liquids, a tank of progressively greater horizontal width from one toward the other end, provided with a horizontal partition, separating said tank into an upper and a lower chamber, the upper chamber being provided at a point between its ends with a cross partition having a series of openings through it at a common level.

3. In an apparatus for the treatment of liquids, a tank of progressively greater width from one toward the other end, provided with a horizontal partition, separating the tank into an upper and a lower chamber, the upper chamber being provided at a point between its ends with a cross partition, which serves to maintain a common level of liquid in the receiving end or section of the tank, and to distribute the outflow uniformly from side to side of the chamber.

4. In an apparatus for the treatment of liquids, a closed settling tank provided with a substantially horizontal partition separating the tank into an upper and a lower section, the upper section having a cross partition or wall of less height than the side walls to hold back the solid matters precipitated by the liquid, but over which the liquid may flow, and the lower section serving as an outflow passage for the clarified liquid, substantially as set forth.

5. In apparatus for the septic treatment of liquids, a tank comprising an upper and a lower chamber, communicating directly one with the other and separated by a substantially horizontal partition; a cross wall or partition in the upper chamber serving as a sludge dam to hold back the matter settling in said chamber; an outlet for the liquid above the floor of the upper chamber and at or near the top of the cross wall or partition; and a roof or cover for the chamber, substantially as described.

6. In an apparatus for the treatment of liquids, a settling tank having an upper and a lower chamber directly communicating with each other and adapted to contain liquid from the bottom of the lower chamber to a point near the top of the upper chamber; and a cross wall or partition in the upper chamber having an outlet at or near its top for communication with the lower chamber, the upper chamber serving as a preliminary settling chamber and the lower chamber as an outlet or as a secondary settling chamber, as required.

7. In an apparatus for the treatment of liquids, a settling tank having an upper and a lower compartment communicating freely with each other, the horizontal partition separating said compartments being provided with a vent to permit the escape, from the lower into the upper compartment, of air or gases collected in the lower compartment.

8. In an apparatus for the treatment of liquids, a series of tanks, each separated by a substantially horizontal partition into an upper and a lower chamber, each upper chamber provided with a cross wall or partition having at or near its top an outlet or passage of communication to the lower chamber; inlets into the upper chambers; pipes or passages connecting the upper chambers of separate tanks with each other; pipes or passages connecting the lower chambers of separate tanks with each other; outlets from the upper and from the lower chambers; and valves controlling the several outlets and the tank-connecting passages, whereby the liquid may be caused to flow in different directions and through two or more of the tanks in series.

9. In an apparatus for the treatment of liquids, a central structure into which the liquid is received, and a plurality of sector-shaped tanks grouped about the central structure and each communicating independently therewith, and each provided with a valve controlling such communication, the several valves being located in the central structure.

10. In an apparatus for the treatment of liquids, the combination of a central structure; a plurality of sector-shaped tanks grouped about said central structure; independent supply pipes opening from the central structure into said tanks, one for each; and outlet pipes for said tanks opening therefrom into the central structure, one for each tank, the respective supply and outlet pipes being each provided with a valve, whereby each tank may be used or controlled independently of all the others.

11. In an apparatus for the treatment of liquids, the combination of a central structure containing a central well or chamber; an annular or curved trough or chamber outside of said well; a settling tank exterior to said trough and provided with an upper and a lower compartment; a pipe connecting said trough with the upper compartment of the tank; and a second pipe connecting the lower compartment of the tank with the central well, substantially as described.

12. The herein described structure or apparatus for the treatment of liquids, consisting of a central structure A, comprising well $d$, encircling trough $e$ $e'$, and tanks B provided with horizontal partition $h$; pipes or passages connecting the trough $e$ with the tanks B; pipes or passages $v$ connecting the tanks with the well $d$; openings $x$ connecting the well $d$ with the trough $e'$ and outlet pipes $y$ opening from the trough $e'$.

13. In combination with the structure A provided with well $d$ and trough $e$, a tank B provided with horizontal partition $h$; a pipe $h'$ affording communication between the space above the partition $h$ and the well $d$; and a valve or gate controlling said pipe.

14. In combination with structure A, comprising well $d$ and trough or tank $e$, settling tank B communicating with trough $e$ and provided with a horizontal partition $h$; a pipe $h'$ extending from the space above the partition $h$ to the well $d$; and a valved outlet $a'$ opening from the bottom of the well $d$.

15. The herein described apparatus for the treatment of liquids, comprising a central structure A having a well $d$ and encircling trough $e$ $e'$; an inlet for the trough $e$; an outlet for the well $d$ affording communication with the trough $e'$; siphons opening out of trough $e'$; a settling tank B (one or more) communicating with trough $e$ and provided with horizontal partition $h$ and cross partition $i$; valve outlet pipe $v$, connecting the lower compartment of the tank B with the well $d$; and a valved pipe $h'$ connecting the upper compartment of the tank B with said well, substantially as described and shown.

In testimony whereof I have signed my name to this specification in the presence of two subscribing witnesses.

FRED P. SMITH.

Witnesses:
J. STEWART RICE,
FANNIE WISE.